Figure 1:
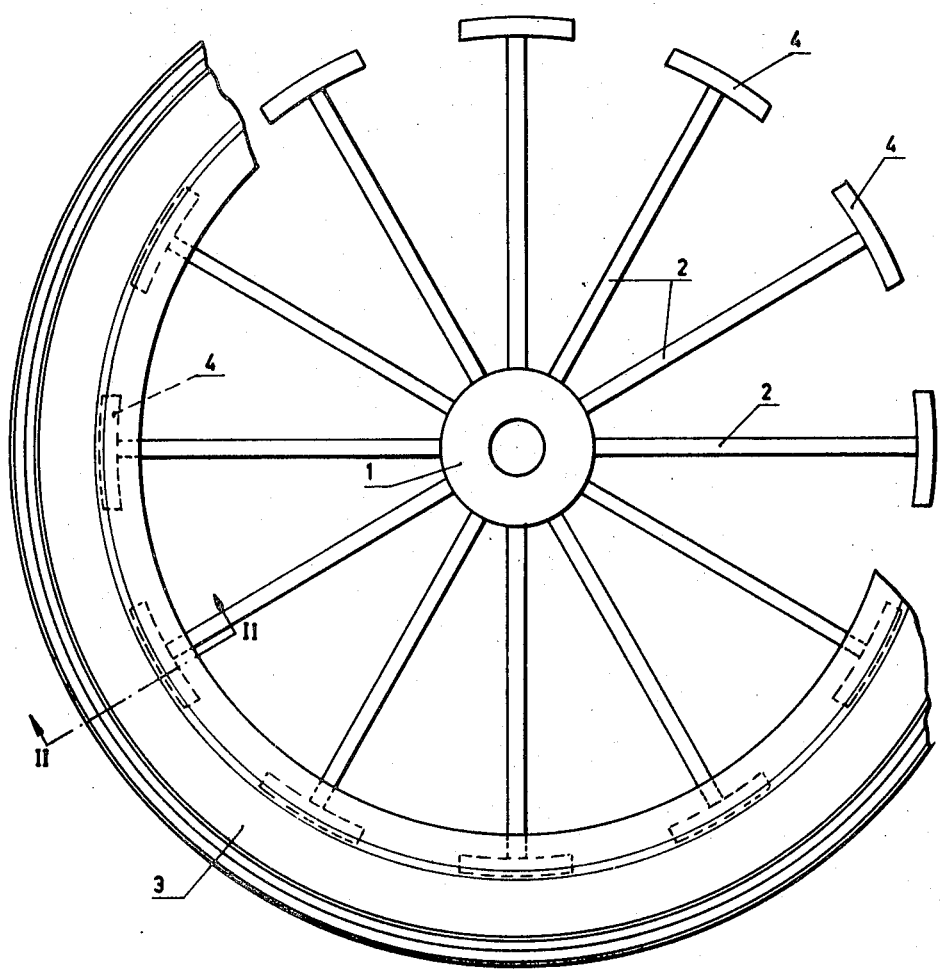

United States Patent
Van Lieshoud

[15] 3,646,983
[45] Mar. 7, 1972

[54] WHEEL COMPRISING A TIRE OF RUBBER OR SYNTHETIC MATERIAL AND A METHOD FOR MANUFACTURING SAID WHEEL

[72] Inventor: Leonardus J. M. Van Lieshoud, Maastricht, Netherlands

[73] Assignee: N. V. Bataafsche Rubber Industrie "Radium", Maastricht, Netherlands

[22] Filed: Dec. 5, 1969

[21] Appl. No.: 882,426

[30] Foreign Application Priority Data

Dec. 12, 1968 Netherlands..........................68/17831

[52] U.S. Cl..............................................152/323, 152/310
[51] Int. Cl..........................................................B60c 7/28
[58] Field of Search..................................152/310, 323, 158

[56] References Cited

UNITED STATES PATENTS

| | | | |
|---|---|---|---|
| 2,165,810 | 7/1939 | Paselk | 152/158 |
| 1,526,503 | 2/1925 | Preston | 152/310 |
| 2,673,470 | 3/1954 | Cosmos | 152/323 |
| 2,836,982 | 6/1958 | Voss | 152/323 |

FOREIGN PATENTS OR APPLICATIONS 403,505 6/1966 Switzerland..........................152/323

Primary Examiner—Arthur L. LaPoint
Assistant Examiner—D. W. Keen
Attorney—Karl W. Flocks

[57] ABSTRACT

A wheel comprising a tire of elastic material in which the end of each of the spokes or the rim of a disc or plate projecting from the wheel hub is embedded.

2 Claims, 10 Drawing Figures

INVENTOR
Leonardus Johannes Maria van Lieshout

BY  Karel Flocks

ATTORNEY

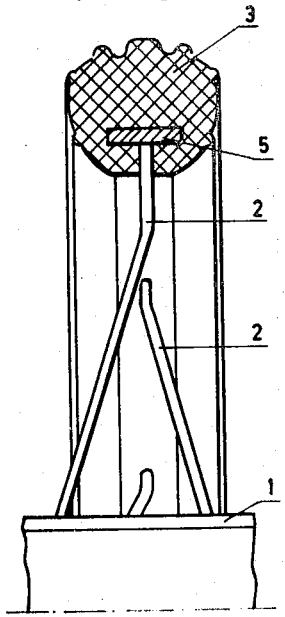
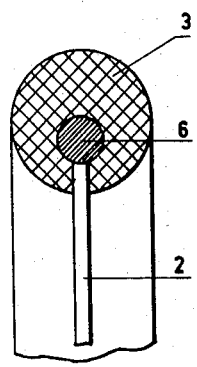
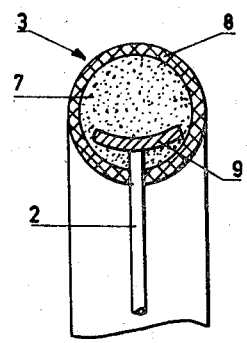
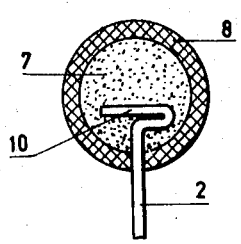
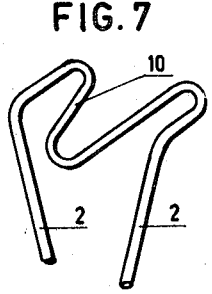
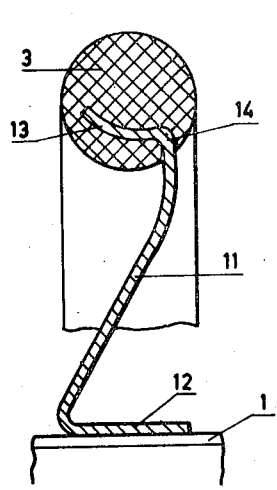
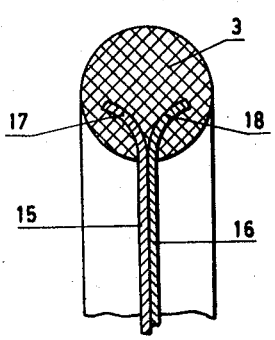
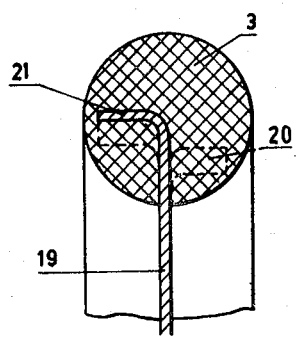

WHEEL COMPRISING A TIRE OF RUBBER OR SYNTHETIC MATERIAL AND A METHOD FOR MANUFACTURING SAID WHEEL

This invention relates to a wheel comprising a tire of rubber or synthetic material as well as spokes connected to a hub or a plate or disc connected to the hub, and relates likewise to a method for manufacturing such a wheel.

It is known to cover entirely or partly wheels comprising a rim for toys, baby carriages, bicycles and for various industrial purposes. It is also known to manufacture tires and to mount these on rims of certain constructions either with or without prestress.

These known wheels have the drawback that the dimensions and the shape of the rim determine the shape of the wheel provided with a tire. In order to avoid an out-of-roundness of the wheel with the tire the rims must comply with strict tolerance requirements, as regards the outer circumference thereof, and, moreover in the case of wheels serving for vehicles with more than one wheel there must be uniformity between the wheels. These requirements entail considerable expenses in the manufacture of rims.

The invention aims at avoiding these drawbacks, which with the wheel according to the invention is accomplished in that the spokes or the plate or disc are or is embedded in the tire with the ends remote from the hub or with the outer edge respectively. In consequence of the fact that the tire is not mounted anymore on the rim, but that the spokes or the plate or disc are embedded in the tire one need only see to it that the hub and the thread of the tire are coaxial which may be accomplished in a simple way when manufacturing the wheel. A difference in length of the spokes thereby cannot influence the shape of the tread, because the ends of the spoke are situated farther or less far in the tire according to the length of the spokes. Consequently also out-of-roundness of the disc or plate or disc or plate wheels does not have any influence on the shape of the tread. In addition to this considerable advantage the wheel according to the invention still presents the great advantage that when manufacturing the tire it is simultaneously nonlosably secured to the spokes or the plate or disc in a simple way and in one single operation. No special demands need be made to the appearance of the plates, disc, annular bands or other part forming the surface of the embedded portion of the spokes, which considerably reduces the cost price of the manufactured wheels.

In order to prevent the spoke ends embedded in the tire from damaging said tire the spokes or the plate or disc may be provided at the end embedded in the tire with at least one support extending transversely to the spoke or the disc or plate. This support may have numerous embodiments. For example it is possible in the case of wheels provided with spokes to use a small plate, small disc or any other part increasing the surface of the embedded spoke ends.

Also each time two spokes may constitute one unit with a central portion bent from the spoke material and extending once or several times transversely to the longitudinal direction of the spokes. In the case of wheels provided with a plate or disc the portion of the plate or disc embedded in the tire may comprise flanges or flange portions.

According to a preferred embodiment the small plates, discs or similar parts increasing the surface of embedded spoke ends of each time a group of spokes or of all spokes may constitute a bent part or ring forming one unit.

The method for manufacturing a wheel according to the invention is characterized in that the hub with spokes or with a wheel plate is placed into a mold comprising openings allowing the spokes to be passed therethrough or an opening allowing the wheel plate to be passed therethrough, said opening or openings being sealed by an elastic sealing and the rubber or synthetic material being introduced into the mold, whereupon after a vulcanization or curing process, if required after cooling, the wheel is removed from the mold.

Figure 2:
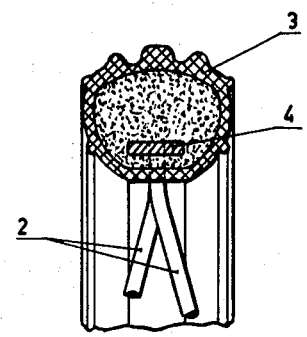

The invention will be further explained below with reference to the drawings showing diagrammatically by way of example some embodiments of the wheel according to the invention. These drawings show in:

FIG. 1 a side view of an embodiment of the wheel according to the invention provided with spokes, part of the wheel having been broken away;

FIG. 2 a section according to the line II—II of FIG. 1;

FIGS. 3 to 7 parts of some other embodiments of a wheel provided with spokes; and FIGS. 8 to 10 parts of some embodiments of a wheel provided with a plate or disc.

The wheel shown in FIGS. 1 and 2 comprises a hub 1, a number of spokes 2 and a tire 3 of rubber or synthetic material, for example polyurethane or polyvinyl chloride. This tire may be of any known construction. For example it may be entirely solid or it may have a cellular core and a solid exterior peripheral portion.

The spokes 2 have at their ends remote from the hub 1 a support in the form of a small plate 4. As is apparent from FIGS. 1 and 2 the small plate 4 of each of the spokes 2 is embedded in the tire 3. In case the spokes 2 are of unequal length said small plates 4 and the ends of the spokes 2 will be located farther or less far from the tire 3, since when manufacturing the wheel the hub 1 is arranged coaxially with the inner wall of a mold in which the wheel is manufactured. After closing the mold and providing a sealing at the points where the spokes pass through the mold, the synthetic material or the rubber may be introduced into the mold, for example by injection. Also other known methods may be used for introducing the tire material into the mold. After the tires has been vulcanized or cured the wheel is removed from the mold, the tire, the spokes and the hub constituting one unit.

The embodiment according to FIG. 3 comprises as a support for the spokes 2 a ring 5 of rectangular cross section, to which the ends of all spokes are secured. This ring is entirely embedded in the tire 3.

The embodiment according to FIG. 4 differs from the one according to FIG. 3 only in that instead of a ring 5 of rectangular cross section a ring 6 having a round cross section is embedded in the tire 3.

In the embodiment according to FIG. 5 a tire 3 is applied which comprises a cellular core 7 and a solid tread 8. The support 9 embedded in this tire has a slightly curved shape and is preferably dimensioned such that its sides extend close to the outer surface of the tire. Supports of this kind, like the embodiments according to FIGS. 3 and 4, preferably have the shape of a closed ring.

The supports together with the spokes 2 may also be made from one rod or wire, as is shown in FIG. 7. The central portion 10 of the rod or wire is bent a few times zigzaglike and, these bent portions of the rod or wire may or may not abut against each other. The portions of the rod or wire projecting from the central portion 10 constitute the spokes 2.

It is also possible to manufacture in this way all spokes 2 and the central portions 10 of the wheel from one single rod or wire and to mount the unit thus obtained on the hub in the form of a ring.

FIGS. 8, 9 and 10 show three different embodiments of plate or disc wheels. Of these embodiments there is shown in FIG. 8 a wheel with one single annular plate or disc 11, both peripheral portions of which are bent. The bent innermost peripheral portion 12 of said plate or disc is fastened to the hub 1, for example by welding, while the bent outermost peripheral portion 13 and the adjoining portion 14 of the plate or disc is embedded in the tire 3. When manufacturing plate or disc wheels one should see to it that the plate or disc 11 is sealingly arranged in the mold.

FIG. 9 differs from the embodiment shown in FIG. 8 in that there are two plates or discs 15, 16, the outer peripheral portions 17 and 18 of which are bent away from each other and embedded in the tire 3. This embodiment is particularly suitable for a tire with a cellular core.

The embodiment according to FIG. 10 presents one single plate or disc 19, the portions 20 and 21 of the outermost peripheral portion pointing alternately towards the left and towards the right and being embedded in the tire 3.

It is obvious that the invention is not restricted to the embodiments described above and shown in the accompanying drawings by way of example, but that these may be modified in many ways without departing from the scope of the invention and that the invention relates to all possible embodiments in which the tire, the spokes and the or each plate or disc respectively and the hub are one integral unit. If the wheels according to the invention are used for toys, the support for the spokes or plates may also be constituted by the front surfaces thereof. The tire may be given any desired profile or color or color combination.

In the preceding text only a few advantages of the wheel according to the invention are mentioned. It is obvious that the wheel according to the invention offers many other advantages. For example in consequence of the fact that the tire is integral with the wheel mounting of the tire on the rim or the wheel is disposed of, and the shape of the tire is not influenced by faulty mounting. Deformation of the rim in the case of weak rims by prestress of the tire is not possible any more etc.

In order to obtain a satisfactory adhesion between the metal parts of the rim and/or of the ends of the spokes embedded in the rubber and the tire said metal parts may be coated at the places suitable for this purpose with an adhesive, as for example the adhesive known under the trademarks Chemlock, Typly or Desmodur.

I claim:

1. A rimless wheel comprising a solid tire of elastic material, a hub, and connecting means consisting of spokes connecting said tire with said hub, said solid tire being molded around the end of said connecting means remote from the hub, the end of said connecting means being provided with at least one transversely extending surface in said tire, said transversely extending surface affording the end of said connecting means remote from said hub a firm support within said tire, said tire being concentric with respect to the inner surface of the hub irrespective of any out-of-roundness or lack of uniformity in radial dimensions of said connecting means with respect to said hub.

2. A rimless wheel comprising a solid tire of elastic material, a hub and connecting means consisting of spokes connecting said tire with said hub, said solid tire being molded around the end of said connecting means remote from the hub, the end of said connecting means being provided with at least one transversely extending surface in said tire, said transversely extending surface affording the end of said connecting means remote from said hub a firm support within said tire, said transversely extending surface comprising a ring secured to the ends of said spokes remote from the hub and around which ring the solid tire is molded, said tire being concentric with respect to the inner surface of the hub irrespective of any out-of-roundness or lack of uniformity in radial dimensions of said connecting means with respect to said hub.

* * * * *